(12) United States Patent
Fan et al.

(10) Patent No.: US 10,353,874 B2
(45) Date of Patent: *Jul. 16, 2019

(54) METHOD AND APPARATUS FOR ASSOCIATING INFORMATION

(71) Applicant: INTERNATIONAL BUSINESS MACHINES CORPORATION, Armonk, NY (US)

(72) Inventors: Si Bin Fan, Beijing (CN); Jun Hua Gao, Beijing (CN); Guo Qiang Li, Beijing (CN); Wen Li, Beijing (CN); Cheng Fang Wang, Beijing (CN); Xiao Lin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,800

(22) Filed: Jul. 31, 2017

(65) Prior Publication Data

US 2017/0329774 A1 Nov. 16, 2017

Related U.S. Application Data

(63) Continuation of application No. 14/667,765, filed on Mar. 25, 2015, now Pat. No. 9,747,302.

(30) Foreign Application Priority Data

May 14, 2014 (CN) .......................... 2014 1 0204134

(51) Int. Cl.
*G06F 9/44* (2018.01)
*G06F 17/30* (2006.01)
(Continued)

(52) U.S. Cl.
CPC ............ *G06F 16/1873* (2019.01); *G06F 8/71* (2013.01)

(58) Field of Classification Search
CPC .......................... G06F 17/2288; G06Q 10/10
(Continued)

(56) References Cited

U.S. PATENT DOCUMENTS

| 7,904,802 B1 | 3/2011 | Kolawa et al. |
| 8,301,722 B2 | 10/2012 | Gimson et al. |

(Continued)

FOREIGN PATENT DOCUMENTS

| CN | 101436157 A | 5/2009 |
| CN | 103677831 A | 3/2014 |
| CN | 105094780 A | 11/2015 |

OTHER PUBLICATIONS

IBM, "List of IBM Patents or Patent Applications Treated as Related (Appendix P)," Jun. 12, 2018, p. 1-2.

(Continued)

*Primary Examiner* — John Q Chavis
(74) *Attorney, Agent, or Firm* — Dmitry Paskalov

(57) ABSTRACT

The present invention belongs to the information processing field and discloses a method and apparatus for associating information. The method for associating information comprises: obtaining identification information of a first content; associating the identification information of the first content with a second content, wherein the second content is created for the first content; obtaining identification information of a third content, wherein the third content is an updated version of the first content, the third content containing revision made according to the second content; and associating the identification information of the third content with the second content. With the method and system for associating information as provided by the present invention, (Continued)

contents of a plurality of versions can be managed and traced efficiently without a need to modify the existing code review flow.

16 Claims, 4 Drawing Sheets

(51) Int. Cl.
    *G06F 16/18* (2019.01)
    *G06F 8/71* (2018.01)
(58) Field of Classification Search
    USPC .......................................................... 709/217
    See application file for complete search history.

(56) References Cited

U.S. PATENT DOCUMENTS

| | | | |
|---|---|---|---|
| 8,429,610 | B2 | 4/2013 | Clemm et al. |
| 8,495,100 | B2 | 7/2013 | Cheung |
| 9,015,118 | B2 | 4/2015 | Velasco |
| 9,747,302 | B2* | 8/2017 | Fan .................... G06F 17/3023 |
| 2008/0295085 | A1 | 11/2008 | Rachamadugu et al. |
| 2009/0210860 | A1 | 8/2009 | Sutherland et al. |
| 2009/0249299 | A1 | 10/2009 | Farchi et al. |
| 2011/0029634 | A1* | 2/2011 | Gimson .............. G06F 17/2288 709/217 |
| 2013/0332902 | A1* | 12/2013 | Wang ........................ G06F 8/38 717/122 |
| 2014/0122182 | A1* | 5/2014 | Cherusseri ......... G06Q 30/0203 705/7.32 |
| 2014/0258984 | A1 | 9/2014 | Kramer et al. |
| 2015/0127798 | A1 | 5/2015 | Tovinger |
| 2015/0331690 | A1 | 11/2015 | Fan et al. |

OTHER PUBLICATIONS

IBM, "A Method and Tool for Code Review Enhancement," An IP.com Prior Art Database Technical Disclosure, Dec. 14, 2012, p. 1-8, IP.com No. 000224221.

Anonymous, "A Method and Tool to Improve Code Review Comments Management," An IP.com Prior Art Database Technical Disclosure, Sep. 22, 2013, p. 1-4, IP.com No. 000230985.

IBM et al., "Finding Differences Between Versions Over Developer's Contributions," An IP.com Prior Art Database Technical Disclosure, Feb. 26, 2009, p. 1-2, IP.com No. 000179792.

Wikipedia, "List of Tools for Code Review," Wikipedia: the Free Encyclopedia, Last Modified on Sep. 12, 2013, p. 1-3, https://en.wikipedia.org/w/index.php?title=List_of_tools_for_code_review&oldid=572643929, Accessed on Feb. 25, 2015.

* cited by examiner

METHOD AND APPARATUS FOR ASSOCIATING INFORMATION

BACKGROUND

The present invention relates to the information processing field, and more specifically, to a method and apparatus for associating information.

With the constant development of software technology, more and more applications have been incorporated into daily life and enterprise operation. As software applications get increasingly popular, there is a growing demand for software development and maintenance.

Many software applications will be continuously modified in the development cycle and during later maintenance, thereby forming a plurality of versions. When backtracking code of these versions, it is hard to learn why code of a certain version are modified, or in which version and how problems existing in code of a certain version are solved.

SUMMARY

In view of the above problems in the prior art, embodiments of the present invention provide a method and apparatus for associating information.

According to one aspect of the present invention, there is provided a method for associating information, the method comprising: obtaining identification information of a first content; associating the identification information of the first content with a second content, wherein the second content is created for the first content; obtaining identification information of a third content, wherein the third content is an updated version of the first content, the third content containing revision made according to the second content; and associating the identification information of the third content with the second content.

According to another aspect of the present invention, there is provided a system for associating information, the system comprising: a first obtaining unit configured to obtain identification information of a first content; a first associating unit configured to associate the identification information of the first content with a second content, wherein the second content is created for the first content; a second obtaining unit configured to obtain identification information of a third content, wherein the third content is an updated version of the first content, the third content containing revision made according to the second content; and a second associating unit configured to associate the identification information of the third content with the second content.

The technical solution provided by the present invention can effectively assist in management and tracing of contents of a plurality of versions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
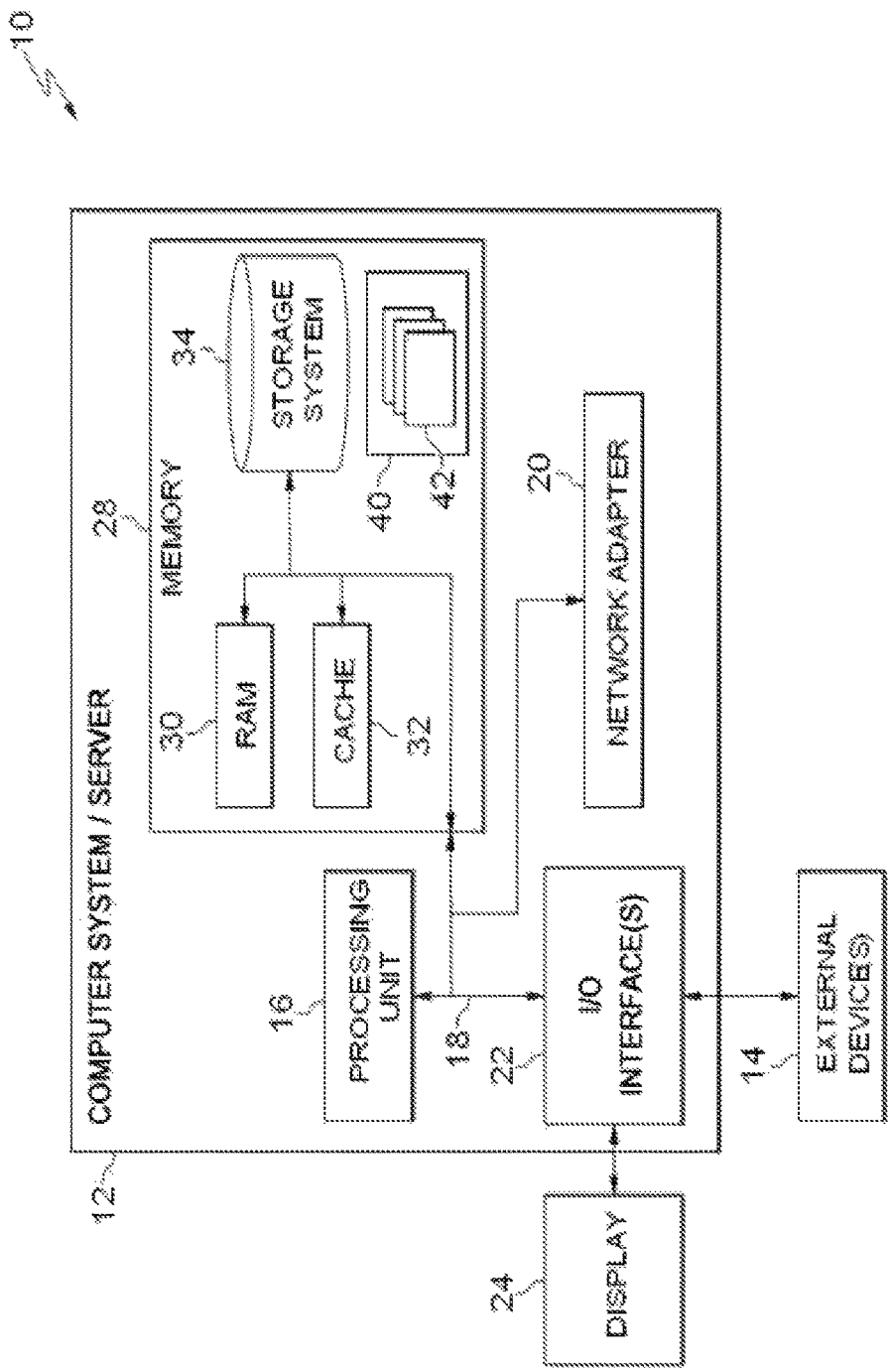
FIG. 1 shows a block diagram of an exemplary computer system/server 12 which is applicable to implement the embodiments of the present invention.

Referring now to FIG. 1, in which a block diagram 10 of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Various embodiments of the present invention to be described below may be implemented in server 12 as shown in FIG. 1, for example.

Figure 2:
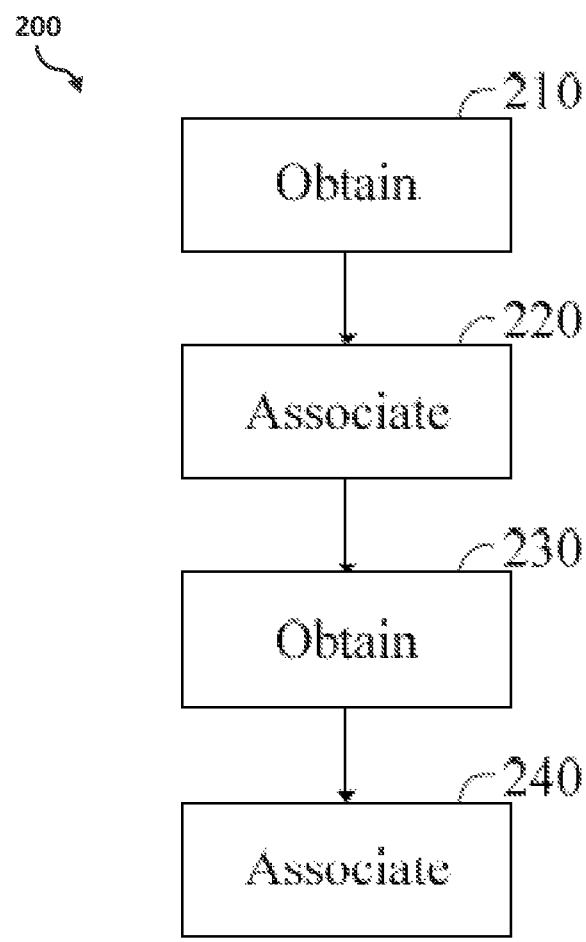
FIG. 2 shows a schematic flowchart of a method for associating information according to one embodiment of the present invention.

With reference to FIG. 2 now, one embodiment of the present invention provides a method 200 for associating information. Method 200 comprises: in step 210, obtaining identification information of a first content; in step 220, associating the identification information of the first content with a second content, wherein the second content is created for the first content; in step 230, obtaining identification information of a third content, wherein the third content is an updated version of the first content, the third content containing revision made according to the second content; and in step 240, associating the identification information of the third content with the second content. For the purpose of easy understanding, illustration is presented below in the context of code review, whereas it is never limited that the present invention can only be applied in the code review field. Instead, the present invention may further be applied in the document review field, for example. In the code review field, the first content includes code of a first version (e.g., code A of a version V1), the second content includes a review of the first version's code (e.g., Comment on the code A of the version V1), the third content includes an updated version of the first version's code, and the third content contains revision made to the first version's code according to the review (e.g., code A of a version V2 resulting from revision to the code A of the version V1 according to Comment). The review comprises, for example, comments, revision suggestions, requirements and other contents, and the present invention do not limit specific contents of the review. In the various embodiments of the present invention, the review may be stored in association with code in different memories, or the review may be stored in combination with code, that is, in the embodiments of the present invention the review may exist independently or be combined with code. By means of the method provided by this embodiment, since the second content is associated with the first content and the third content, the first content and the third content can be obtained accordingly by finding the second content, or the second content can be seen by finding the first content or the third content. In particular, when applied in the code review field, in the prior art it is hard to learn what review is triggered by code of a given version and which review is resolved thereby, and also it is impossible to learn, from a review, to which version's code this review pertains and in which version's code the review is resolved. By means of the technical solution provided by this embodiment, future management and query are made convenient by associating the review with its start version and end version or interim version. For example, by searching for reviews, a user can find a certain review and conveniently learn in which version the review is added and in which version it is resolved. For another example, the user, when browsing code, may conveniently learn which reviews appear in this code and which reviews are resolved by the code. Further, the user may find a corresponding version from an associated review, then browse other reviews corresponding to the version and expand more browses as such.

In one embodiment of the present invention, identification information of the code comprises, for example, at least one of: version information, an identifier, and a storage address. The identifier may be used for uniquely identifying the code. Thus, the identification information of the first content comprises at least one of: version information of the first content; an identifier of the first content; and a storage address of the first content. The identification information of the third content comprises at least one of: version information of the third content; an identifier of the third content; and a storage address of the third content.

In one embodiment of the present invention, the method for building association may build a table for recording the above relationships, thereby completing association. For example, the table records that a first review corresponds to the code of the version V1 while an end version of the first review is V10. By processing the table as such, the above association may be put to various usages. In another embodiment of the present invention, the method for building association may centrally record the above relationships in other storage mode, such as a storage page, etc.

In one embodiment of the present invention, the above relationships may also be recorded in a scattered storage mode, thereby completing association. For example, step 220 may comprise: storing the identification information of the first content as a first attribute of the second content. For example, a field may be added to a review's data structure for recording relevant information of a start version to which the review pertains. In this embodiment, only an existing storage data structure of a review needs slight change, while original content or storage of the review needs no change at all, so a field is added to record the identification information of the first content, e.g., a field is added to record startversion=20. In the embodiments of the present invention, an attribute of the second content may form a complete data structure together with the second content, or may be independent of the second content and stored in association therewith. Likewise, in the embodiments of the present invention, other attribute may exist independently or be stored in association with a corresponding content. In the embodiments of the present invention, the processing time for querying associated contents may be reduced by scattered storage. If centralized storage is used, the whole table or storage page might become very large, and in turn much time is needed for query, whereas scattered storage has no such trouble.

In one embodiment of the present invention, step 240 may comprise, for example: storing the identification information of the third content as a second attribute of the second content, if the third content is an end version for the second content. For example, a field may be added to a data structure of a review to record relevant information of an end version to which the review pertains. For example, a field is added to record endversion=30.

In one embodiment of the present invention, step 240 may comprise, for example: storing the identification information of the third content as a third attribute of the second content, if the third content is an interim version for the second content. For example, a field may be added to a data structure of a review to record interimversion=24.

In one embodiment of the present invention, the method as shown in FIG. 2 further comprises: storing information that points to the second content as a first attribute of the first content. Specifically, SCM maintains various attributes for managed code, and regarding the embodiments of the present invention, an attribute for code may be added to record which reviews are proposed for code of the version. For example, the information may be recorded in response to a review being built. For example, an attribute initiatecomment for code may be added to SCM. The attribute may be, for example, an array, a queue or a linked list. Each element in initiatecomment corresponds to a link of a review or a concrete review. For example, if reviews are stored in SCM, then each element may correspond to a concrete review; if reviews are stored in a review tool or other storage, then each element may correspond to a link of a review via which the corresponding review may be obtained. It may be understood the example is exemplary and does not limit the scope of the present invention. For example, the attribute initiatecomment may also record a unique ID or storage address of a review.

In one embodiment of the present invention, the method as shown in FIG. 2 further comprises: storing information that points to the second content as a second attribute of the third content, if the third content is an end version for the second content. Specifically, SCM maintains various attributes for managed code, and regarding the embodiments of the present invention, an attribute for code may be added to record which reviews are resolved for code of the version. In this embodiment, regarding record of an attribute, reference may be made to the foregoing embodiment, e.g., an attribute resolvecomment may be used to record an end version. For a concrete recording approach, please refer to the foregoing embodiment, which is not detailed here.

In one embodiment of the present invention, the method as shown in FIG. 2 may further comprise: storing information that points to the second content as a third attribute of the third content, if the third content is an interim version of the second content. Like the foregoing embodiments, an attribute for the third content may be added to record reviews corresponding thereto.

In the foregoing embodiments of the present invention, the first attributes of the first and third contents are used for recording reviews that appear in the version; the second attributes of the first and third contents are used for recording reviews that are resolved in the version; the third attributes of the first and third contents are used for recording reviews that are experienced and pending in the version.

The first attribute of the second content is used for, for example, recording a start version corresponding to the review, and the second attribute thereof is used for, for example, recording an end version where the review is resolved, and the third attribute thereof is used for, for example, recording an interim version where the review is pending.

In one embodiment of the present invention, to determine an end version, the method as shown in FIG. 2 further comprises one of: in response to the third content being a currently reviewed content, determining the third content as an end version for the second content if the second content is approved in the review; in response to the third content being created, determining the third content as an end version for the second content; in response to the third content being submitted for review, determining the third content as an end version for the second content; and if the third content being a current to-be-reviewed content, in response to the second content being marked as resolved, determining the third content as an end version for the second content. No matter which one of these concrete implementations is used, the existing code review flow will not be changed or affected. Of course, those skilled in the art may obtain more methods for determining an end version according to the above examples.

In one embodiment of the present invention, to determine an interim version, the method as shown in FIG. 2 may further comprise one of: in response to the third content being a currently reviewed content, determining the third content as an interim version for the second content if the second content is rejected in the review; in response to the third content being created, determining the third content as an interim version for the second content; and in response to the third content being submitted for review, determining the third content as an interim version for the second content.

In the embodiments of the present invention, the methods for determining an interim version and an end version may be combined with each other to obtain more examples. For example, regarding the circumstance where a version determined as an interim version is created or submitted for review, if in the subsequent review flow the review is approved when the version is a currently reviewed content, then the version may be re-determined as an end version. In the combinations, those skilled in the art are clear about how to achieve reasonable combinations, which is not detailed here.

In the foregoing embodiments, a user (e.g., a reviewer) may create a review (comment) for the first content (e.g., code 1 of the version V10), and subsequently a user (e.g., a developer) may obtain the third content (e.g., code 1 of a version V13) on the basis of revision to the first content according to the review. In the review flow, the user (e.g., the reviewer) might consider the revision improper and thus reject the third content, while the user (e.g., the developer) might subsequently obtain a fourth content (code 1 of a version V15) based on revision to the third content (or the first content) according to the review, and the fourth content is finally approved by the user (e.g., the reviewer) as an end version.

In one embodiment of the present invention, the method as shown in FIG. 2 further comprises: receiving a first request for review, the first request comprising an identifier of a first group, contents in the first group being dynamically determined according to a content to be reviewed, the first group comprising at least the first content; extracting from a storage a content in the first group according to the received first request; generating a difference file according to the extracted content, for a user to create the second content for the first content according to the difference file. It may be understood this example is related to the circumstance where the first content is contained. If the content to be reviewed does not comprise the first content, then it may be understood the first group comprises the first content no more or what is contained in the request is another group. By means of the method provided by the embodiments of the present invention, code may be reviewed more efficiently. For example, according to the prior art, a developer directly sends code 1 of versions v11 and v12 to a plurality of reviewers. If a first reviewer has created a review to a first segment of the code 1 of the version v12, while the developer has revised the first segment for the review; since other reviewers cannot see such revision, they still might review the same code and give similar comments, and such efforts are duplicated. By means of the method provided by this embodiment, the developer sends the first group to a plurality of reviewers, contents of the first group being dynamically determined according to a content to be reviewed. When the first reviewer handles the request, the first group comprises the code 1 of the versions v12 and v11 to be reviewed. If the developer has revised the first segment of the code 1 of the version v12 according to a review created by the first reviewer to the first segment of the code 1 of the version v12 and thus formed a version v13, then contents to be reviewed become the code 1 of the version v12 and code 1 of the version v13, and in turn the first group will comprise the code 1 of the version v12 and the code 1 of the version v13. Thereby, when other reviewer makes reviews subsequently, what is obtained by the system is code of the version v13. Accordingly, other reviewer will not review the same code similarly, and duplicated efforts are avoided. In the embodiments of the present invention, when the first group comprises a new code, an original code may be either removed or still retained in the group. For example, in the foregoing example, the code 1 of the version v12 may be removed from the first group or still retained in the first group. If the code 1 of the version v12 is removed, then a difference file is generated using the code 1 of the versions v11 and v13 directly; if being retained, then a difference file is generated using the code 1 of the versions v11, v12 and v13. Of course, it may be understood that a difference file may further be generated using the versions v12 and v13 for a subsequent reviewer to review the code 1 of the version v13.

Figure 3:
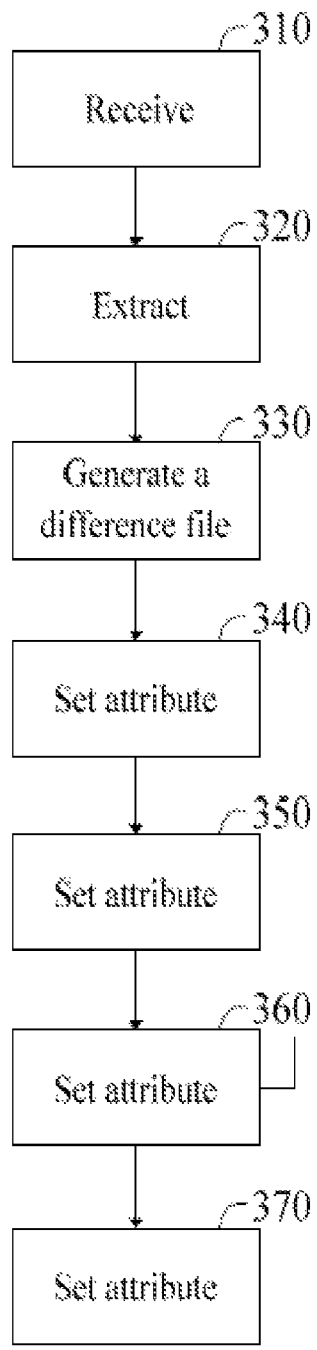
FIG. 3 shows a schematic flowchart of an example of combining multiple embodiments of the present invention.

The foregoing method embodiments may refer to and be combined with each other to obtain more embodiments. With reference to FIG. 3, detailed illustration is presented below to illustrate an example of combining these embodiments. FIG. 3 shows the concrete process of code review by means of the embodiments of the present invention.

In step 310, a code review request is received, wherein the review request contains an ID of a first group.

In step 320, a to-be-reviewed content contained in the group is extracted from a storage according to the group ID in the code review request. Specifically, a corresponding content is obtained from SCM, for example. The first group comprises for example code 2 of a version v14 and code 2 of a version 16.

In step 330, a difference file is generated according to the extracted content for a user to create a review. Specifically, for example, a difference file is generated using the code 2 of the version v14 and the code 2 of the version v16 for a reviewer to create a review to the code 2 of the version v16.

In step 340, in response to a review 1 being created, an attribute startversion of the review 1 is set as v16, and an attribute initiatecomment of code of the version v16 is set as a link pointing to the review 1. After the review is created, the flow will return to a developer, and the developer will see the review 1.

In step 350, in response to code 2 of a version v17 being submitted for review, an attribute endversion of the review 1 is set as v17, and an attribute resolvecomment of the code 2 of the version v17 is set as a link pointing to the review 1. The code 2 of the version v17 results from revision to the code 2 of the version v16 according to the review 1. Step 350 is merely an example; this attribute may be set in response to the code 2 of the version v17 being created, being approved finally, or being marked by the user as resolving the review 1. After receiving a request to submit a review, the system processes like steps 310 to 330, i.e., extracting a content contained in the group and generating a difference file for review.

In step 360, in response to the code 2 of the version v17 being rejected, an attribute interimversion of the review 1 is set as v17, and an attribute interimcomment of the code 2 of the version v17 is set as a link pointing to the review 1. In this embodiment, step 360 may either clear the attribute endversion of the review 1 or still keep it.

In step 370, in response to code 2 of a version v18 being submitted for review, the attribute endversion of the review 1 is set as v18, and an attribute resolvecomment of the code 2 of the version v18 is set as a link pointing to the review 1. In this embodiment, the attribute endversion of the review 1 may be set as v18, and the attribute resolvecomment of the code 2 of the version v18 may be set as a link pointing to the review 1, only in response to the code 2 of the version v18 being approved finally.

In one embodiment of the present invention, by means of the association relationship built in the foregoing embodiments, further retrieval and processing may be conducted. For example, the method as shown in FIG. 2 may further comprise: receiving a second request for the second content; providing at least one of a content of a start version, a content of an end version, a content of an interim version and a difference file, wherein the content of the start version is a content identified by the first attribute of the second content; the end version is a content identified by the second attribute of the second content; the content of the interim version is a content identified by the third attribute of the second content; and the difference file is generated according to at least two of the content of the start version, the content of the end version and the content of the interim version. Specifically, for example, the user retrieves a review 3 among reviews using a keyword, at which point respective contents to which attributes startversion and endversion of the review 3 point may be provided to the user as a start version and an end version respectively. Further, a difference file may be generated according to the start version and the end version for the user to learn what a code segment resolving the review 3 is like. In the prior art, if the user wants to learn which code segment resolves a given review, it is quite difficult or even impossible. Of course, the embodiments of the present invention do not limit how a reviewed is pointed to, e.g., by retrieval or clicking directly.

In one embodiment of the present invention, the method as shown in FIG. 2 may further comprise at least one of: in response to receiving a third request for the first content, providing the first content and a content to which the first attribute of the first content points; in response to receiving a fourth request for the third content, providing the third content and at least one of: a content to which the second attribute of the third content points, and a content to which the third attribute of the third content points. With the method provided by this embodiment, while code is being requested, a start review, a resolved review and a pending review of the version code may be provided to the user also.

According to the foregoing example, those skilled in the art may obtain more technical solutions for building association using the foregoing method. For example, when the user selects code of a version from SCM, he may know which reviews are triggered by the code of the version and which reviewed are resolved. If the user wants to know how a triggered review is resolved, he may use the foregoing method to find an end version of a corresponding review and generate a difference file.

The foregoing embodiments of the present invention may be implemented in a code review tool or in an SCM product or in other product, and the present invention is not limited in this regard.

Figure 4:
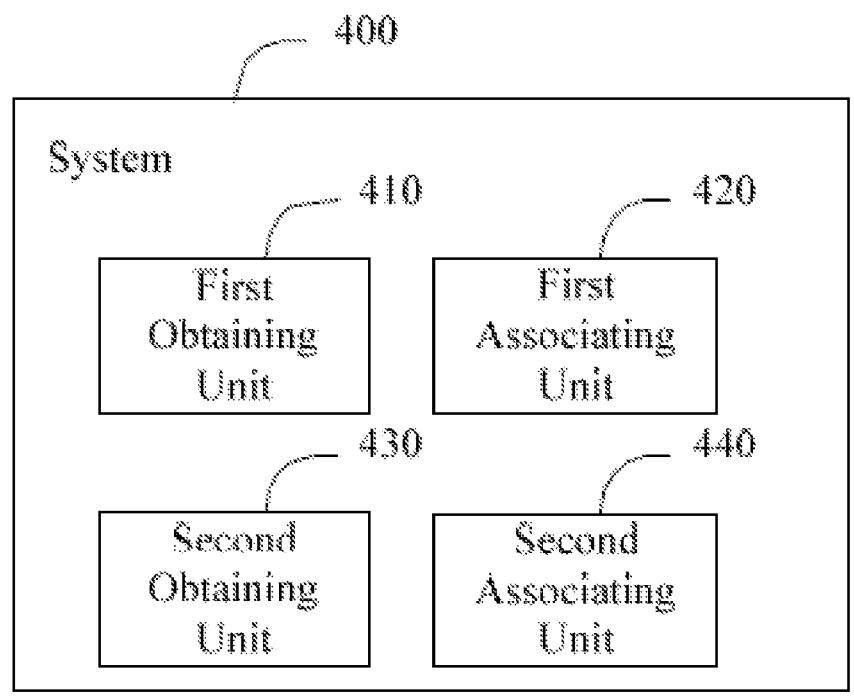
FIG. 4 shows a schematic structural diagram of a system for associating information according to one embodiment of the present invention.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided a system for associating information. Even if the apparatuses and systems have the same hardware structure as a general-purpose processing device, the functionality of software contained therein makes the apparatuses and systems manifest distinguishing properties from the general-purpose processing device, thereby forming apparatuses and systems of the various embodiments of the present invention. With reference to FIG. 4, detailed description is presented below to a system for associating information according to one embodiment of the present invention.

As shown in FIG. 4, the embodiments of the present invention provide a system 400 for associating information. System 400 comprises: a first obtaining unit 410 configured to obtain identification information of a first content; a first associating unit 420 configured to associate the identification information of the first content with a second content, wherein the second content is created for the first content; a second obtaining unit 430 configured to obtain identification information of a third content, wherein the third content is an updated version of the first content, the third content containing revision made according to the second content; and a second associating unit 440 configured to associate the identification information of the third content with the second content. By means of system 400 provided by the embodiments of the present invention, the user may conveniently find a corresponding code according to a review, thereby learning what a code segment resolving the review is like.

In one embodiment of the present invention, the first associating unit 420 comprises for example a first attribute setting module configured to store the identification information of the first content as a first attribute of the second content. In another embodiment of the present invention, the second associating unit 440 comprises for example at least one of: a second attribute setting module configured to store the identification information of the third content as a second attribute of the second content; and a third attribute setting module configured to store the identification information of the third content as a third attribute of the second content.

In one embodiment of the present invention, system 400 as shown in FIG. 4 comprises for example at least one of: a fourth attribute setting module configured to store information that points to the second content as a first attribute of the first content; a fifth attribute setting module configured to store information that points to the second content as a second attribute of the third content, if the third content is an end version for the second content; and a sixth attribute setting module configured to, if the third content is an interim version for the second content, store information that points to the second content as a third attribute of the third content and store the identification information of the third content as a third attribute of the second content.

In one embodiment of the present invention, system 400 further comprises one of: a first determining unit configured to, in response to the third content being a currently reviewed content, determine the third content as an end version for the second content if the second content is approved in the review; a second determining unit configured to, in response to the third content being created, determine the third content as an end version for the second content; a third determining unit configured to, in response to the third content being submitted for review, determine the third content as an end version for the second content; and a fourth determining unit configured to, if the third content being a currently to-be-reviewed content, determine the third content as an end version for the second content in response to the second content being marked as resolved.

In one embodiment of the present invention, system 400 further comprises one of: a fifth determining unit configured to, in response to the third content being a currently reviewed content, determine the third content as an interim version for the second content if the second content is rejected in the review; a sixth determining unit configured to, in response to the third content being created, determine the third content as an interim version for the second content; and a seventh determining unit configured to, in response to the third content being submitted for review, determine the third content as an interim version for the second content.

In one embodiment of the present invention, system 400 further comprises: a first receiving unit configured to receive a first request for review, the first request comprising an identifier of a first group, contents contained in the first group being dynamically determined according to a content to be reviewed, the first group comprising at least the first content; an extracting unit configured to extract from a storage a content in the first group according to the received first request; a generating unit configured to generate a difference file according to the extracted content, for a user to create the second content for the first content according to the difference file.

In one embodiment of the present invention, system 400 further comprises: a second receiving unit configured to receive a second request for the second content; and a providing unit configured to provide at least one of a content of a start version, a content of an end version, a content of an interim version and a difference file, wherein the content of the start version is a content identified by the first attribute of the second content; the end version is a content identified by the second attribute of the second content; the content of the interim version is a content identified by the third attribute of the second content; and the difference file is generated according to at least two of the content of the start version, the content of the end version and the content of the interim version.

For implementation details in the foregoing apparatus embodiments, reference may be made to the corresponding method embodiments, which is not detailed here. Moreover, these apparatus embodiments may also refer to each other for obtaining more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for conveniently finding a corresponding code according to a review by associating information extracted from an online code review tool, the computer implemented method comprising:
obtaining extracted identification information of a first content from the online code review tool, wherein obtaining the extracted identification information includes extracting a stored code of a first version from a document review field associated with the stored code;
associating the extracted identification information of the first content with a second content, wherein the second content is created for the first content, and the second content includes extracted information from the document review field associated with the stored code and pertaining to the review of the first version's code, wherein the extracted information pertaining to the review of the first version's code includes a comment on the extracted stored code of the first version and a version number associated with the extracted stored code of the first version;
obtaining identification information of a third content, wherein the third content is an updated version of the first content, the third content containing revision made according to the second content, wherein the third content includes a plurality of comments, revision suggestions, and requirements associated with the extracted stored code of the first version based on the second content;
associating the identification information of the third content with the second content by storing the identification information of the first content as a first attribute of the second content, and wherein the first content comprises code of a first version, the third content comprises code of a second version, and the second content comprises a review on the code of the first version;
storing information that points to the second content as a first attribute of the first content;
storing information that points to the second content as a second attribute of the third content, if the third content is an end version for the second content;
storing information that points to the second content as a third attribute of the third content, if the third content is an interim version for the second content;
receiving a first request for review, the first request comprising an identifier of a first group, contents contained in the first group being dynamically determined according to a to-be-reviewed content, the first group comprising at least the first content;
extracting from a storage a content in the first group according to the received first request; and
generating a difference file according to the extracted content, for a user to create the second content for the first content according to the difference file.

2. The method according to claim 1, wherein the associating the identification information of the third content with the second content comprises at least one of:
storing the identification information of the third content as a second attribute of the second content, if the third content is an end version for the second content; and
storing the identification information of the third content as a third attribute of the second content, if the third content is an interim version for the second content.

3. The method according to claim 1, wherein the method further comprises one of:
in response to the third content being a currently reviewed content, determining the third content as an end version for the second content if the second content is approved in the review;
in response to the third content being created, determining the third content as an end version for the second content;
in response to the third content being submitted for review, determining the third content as an end version for the second content; and
if the third content being a currently to-be-reviewed content, determining the third content as an end version for the second content in response to the second content being marked as resolved.

4. The method according to claim 1, wherein the method further comprises one of:
in response to the third content being a currently reviewed content, determining the third content as an interim version for the second content if the second content is rejected in the review;
in response to the third content being created, determining the third content as an interim version for the second content; and
in response to the third content being submitted for review, determining the third content as an interim version for the second content.

5. The method according to claim 1, wherein:
the identification information comprises at least one of: version information; a unique identifier; and a storage address.

6. The method according to claim 1, wherein the method further comprises:
receiving a second request for the second content; and
providing at least one of a content of a start version, a content of an end version, a content of an interim version and a difference file, wherein the content of the start version is a content identified by the first attribute of the second content; the end version is a content identified by the second attribute of the second content; the content of the interim version is a content identified by the third attribute of the second content; and the difference file is generated according to at least two of the content of the start version, the content of the end version and the content of the interim version.

7. The method according to claim 1, wherein the method further comprises at least one of:
in response to receiving a third request for the first content, providing the first content and a content to which the first attribute of the first content points; and
in response to receiving a fourth request for the third content, providing the third content and at least one of: a content to which the second attribute of the third content points, and a content to which the third attribute of the third content points.

8. A computer system for conveniently finding a corresponding code according to a review by associating information extracted from an online code review tool, the computer system comprising:

one or more processors, one or more computer-readable memories, one or more computer-readable tangible storage devices, wherein the one or more computer-readable tangible storage devices are not transitory signals per se, and program instructions stored on at least one of the one or more storage devices for execution by at least one of the one or more processors via at least one of the one or more memories, wherein the computer system is capable of performing a method comprising:

obtaining extracted identification information of a first content from the online code review tool, wherein obtaining the extracted identification information includes extracting a stored code of a first version from a document review field associated with the stored code;

associating the extracted identification information of the first content with a second content, wherein the second content is created for the first content, and the second content includes extracted information from the document review field associated with the stored code and pertaining to the review of the first version's code, wherein the extracted information pertaining to the review of the first version's code includes a comment on the extracted stored code of the first version and a version number associated with the extracted stored code of the first version;

obtaining identification information of a third content, wherein the third content is an updated version of the first content, the third content containing revision made according to the second content, wherein the third content includes a plurality of comments, revision suggestions, and requirements associated with the extracted stored code of the first version based on the second content;

associating the identification information of the third content with the second content by storing the identification information of the first content as a first attribute of the second content, and wherein the first content comprises code of a first version, the third content comprises code of a second version, and the second content comprises a review on the code of the first version;

storing information that points to the second content as a first attribute of the first content;

storing information that points to the second content as a second attribute of the third content, if the third content is an end version for the second content;

storing information that points to the second content as a third attribute of the third content, if the third content is an interim version for the second content;

receiving a first request for review, the first request comprising an identifier of a first group, contents contained in the first group being dynamically determined according to a to-be-reviewed content, the first group comprising at least the first content;

extracting from a storage a content in the first group according to the received first request; and generating a difference file according to the extracted content, for a user to create the second content for the first content according to the difference file.

9. The system according to claim 8, wherein:
the first associating unit comprises: a first attribute setting module configured to store the identification information of the first content as a first attribute of the second content.

10. The system according to claim 8, wherein the second associating unit comprises at least one of:
a second attribute setting module configured to store the identification information of the third content as a second attribute of the second content; and
a third attribute setting module configured to store the identification information of the third content as a third attribute of the second content.

11. The system according to claim 8, wherein the system further comprises at least one of:
a fourth attribute setting module configured to store information that points to the second content as a first attribute of the first content;
a fifth attribute setting module configured to store information that points to the second content as a second attribute of the third content, if the third content is an end version for the second content; and
a sixth attribute setting module configured to store information that points to the second content as a third attribute of the third content, if the third content is an interim version for the second content.

12. The system according to claim 8, wherein the system further comprises at least one of:
a first determining unit configured to, in response to the third content being a currently reviewed content, determine the third content as an end version for the second content if the second content is approved in the review;
a second determining unit configured to, in response to the third content being created, determine the third content as an end version for the second content;
a third determining unit configured to, in response to the third content being submitted for review, determine the third content as an end version for the second content; and
a fourth determining unit configured to, if the third content being a currently to-be-reviewed content, determine the third content as an end version for the second content in response to the second content being marked as resolved.

13. The system according to claim 8, wherein the system further comprises one of:
a fifth determining unit configured to, in response to the third content being a currently reviewed content, determine the third content as an interim version for the second content if the second content is rejected in the review;
a sixth determining unit configured to, in response to the third content being created, determine the third content as an interim version for the second content; and
a seventh determining unit configured to, in response to the third content being submitted for review, determine the third content as an interim version for the second content.

14. The system according to claim 8, wherein the first content comprises code of a first version, the third content comprises code of a second version obtained on the basis of revision to the code of the first version according to the second content, and the second content comprises a review on the code of the first version; and
the identification information comprises at least one of: version information; an identifier; and a storage address.

15. The system according to claim 8, wherein the system further comprises:
a first receiving unit configured to receive a first request for review, the first request comprising an identifier of a first group, contents contained in the first group being dynamically determined according to a to-be-reviewed content, the first group comprising at least the first content;

an extracting unit configured to extract from a storage a content in the first group according to the received first request; and a generating unit configured to generate a difference file according to the extracted content, for a user to create the second content for the first content according to the difference file.

16. The system according to claim 8, wherein the system further comprises:

a second receiving unit configured to receive a second request for the second content; and a providing unit configured to provide at least one of a content of a start version, a content of an end version, a content of an interim version and a difference file, wherein the content of the start version is a content identified by the first attribute of the second content; the end version is a content identified by the second attribute of the second content; the content of the interim version is a content identified by the third attribute of the second content; and the difference file is generated according to at least two of the content of the start version, the content of the end version and the content of the interim version.

* * * * *